United States Patent Office 3,763,186
Patented Oct. 2, 1973

3,763,186
EPITHIO DERIVATIVES OF AMINOALKYL
SUBSTITUTED DIBENZOCYCLOHEPTENES
Niels Lassen, Gentofte, Denmark, assignor to
Kefalas A/S, Copenhagen-Valby, Denmark
No Drawing. Filed Oct. 21, 1971, Ser. No. 191,500
Claims priority, application Great Britain, Oct. 30, 1970,
51,829/70
Int. Cl. A61k 27/00; C07d 63/04
U.S. Cl. 260—330.5
14 Claims

ABSTRACT OF THE DISCLOSURE

Dibenzocycloheptenes of the general formula:

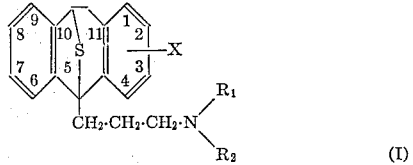

(I)

wherein $R_1$ and $R_2$ each represents hydrogen or an alkyl group with 1 to 4 carbon atoms, provided that $R_1$ and $R_2$ may not both represent hydrogen, and X represents hydrogen, an alkyl group with 1 to 4 carbon atoms, an alkyloxy group with 1 to 4 carbon atoms, halogen or trifluoromethyl, as well as non-toxic acid addition salts thereof, and preparation of same. Intermediates useful in the preparation of said compounds as well as preparation of said intermediates. Pharmaceutical compositions containing a compound of Formula I or an acid addition salt thereof, and alleviation, palliation, mitigation or inhibition of the manifestations of certain physiological-psychological abnormalities of animals therewith.

This invention relates to novel derivatives of dibenzocycloheptenes of the following general formula:

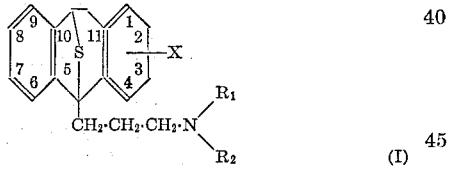

(I)

wherein $R_1$ and $R_2$ each represents hydrogen or an alkyl group with from 1 to 4 carbon atoms, provided that $R_1$ and $R_2$ may not both represent hydrogen, and X represents hydrogen, an alkyl group with from 1 to 4 carbon atoms, an alkyloxy group with from 1 to 4 carbon atoms, halogen or trifluoromethyl, as well as non-toxic acid addition salts thereof, and methods of preparing the same.

The invention also relates to intermediates useful in the preparation of the above compounds as well as processes for the preparation of said intermediates.

Moreover, the invention pertains to pharmaceutical compositions containing a compound of Formula I or an acid addition salt thereof, and a method for the alleviation, palliation, mitigation or inhibition of the manifestations of certain physiological-psychological abnormalities of animals therewith.

The compound of Formula I and the acid addition salts thereof are useful therapeutics and possess valuable pharmacodynamic properties. In animal experiments the compounds show a very pronounced potentiating effect on adrenaline and nor-adrenaline and also a very strong anti-tetrabenazine effect. They, moreover, have only weak sedative and anti-cholinergic effects. These effects as compared with a relatively low toxicity make the compounds of Formula I as well as their acid addition salts very useful in treatment within the psychotherapy, especially of endogenic depressions.

The compounds of Formula I and the non-toxic acid addition salts thereof may be administered both orally and parenterally, for example in the form of tablets, capsules, powders, syrups or solutions for injection.

The invention moreover relates to a method for the preparation of compounds of Formula I, whereby a compound of the following formula:

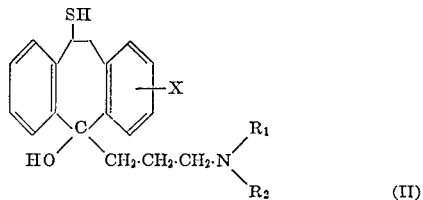

(II)

wherein $R_1$, $R_2$ and X are as defined above, is reacted with a dehydrating agent, whereupon the compound of Formula I is isolated as the free amine or as a non-toxic acid addition salt in conventional manner, and in the case when $R_1$ and $R_2$ each represents an alkyl group, if desired, reacting the compound of Formula I with a chloroformic acid ester of the formula Cl·COOR$_3$, wherein $R_3$ represents an alkyl group or a benzyl group, hydrolysing the resulting compound of the formula:

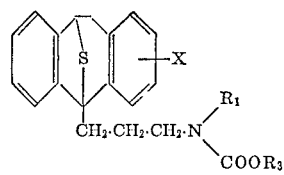

and isolating the compound of Formula I, wherein $R_1$ is an alkyl group with from 1–4 carbon atoms and $R_2$ is hydrogen as the free amine or in the form of a non-toxic acid addition salt.

As dehydrating agent is preferably used a hydrogen halide, such as hydrogen chloride, in glacial acetic acid or an inert organic solvent such as chloroform. The reaction temperature is preferably from about zero degrees centigrade to about the boiling point of the solvent used.

The acid addition salts of the novel compounds of Formula I are preferably salts of pharmacologically acceptable non-toxic acids such as mineral acids, for example, hydrochloric acid, hydrobromic acid, phosphoric acid, sulphuric acid, and the like, and organic acids such as acetic acid, tartaric acid, maleic acid, citric acid, oxalic acid, methane sulphonic acid, and the like.

The starting compounds of Formula II which are novel compounds and also form part of this invention may be prepared in the following way:

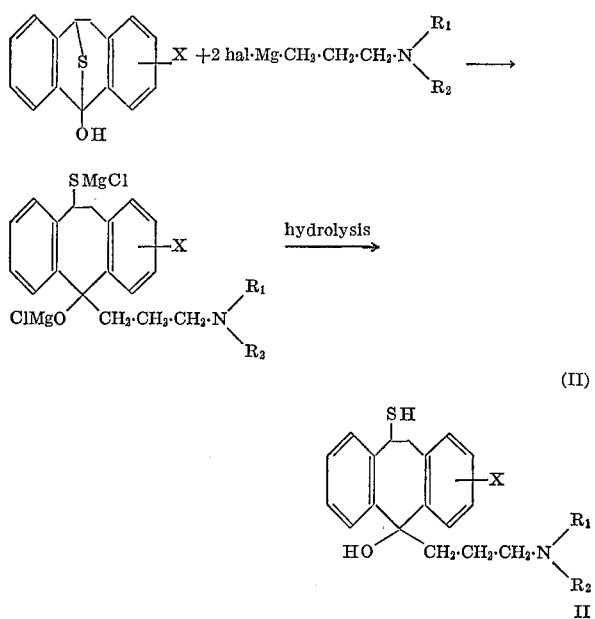

wherein $R_1$, $R_2$ and X are as defined above, and "hal" represents a halogen atom selected from chlorine, bromine and iodine.

The Grignard-reaction is as usual carried out in an anhydrous inert solvent, such as ether or tetrahydrofuran, and the hydrolysis carried out in a weakly acid medium.

Of the compounds of Formula I 10,11-dihydro-5-(3-dimethylaminopropyl) - 5,10-epithio-5H-dibenzo[a,d]cyclohepten and 10,11-dihydro-5-(3-methylaminopropyl)-5,10-epithio-5H-dibenzo[a,d]cycloheptene have proved promising both in the pharmacological tests and seen from the standpoint of easy manufacture.

The following examples are given by way of illustration only and are not to be construed as limiting.

EXAMPLE 1

10,11-dihydro-5-(3-dimethylaminopropyl)-5,10-epthio-5H-dibenzo[a,d]cyclohepten and its hydrochloride The starting 10,11-dihydro-5-(3-dimethylaminopropyl)-10-mercapto - 5H - dibenzo[a,d]cyclohepten-5-ol was obtained as follows:

125 grams of 10-bromo-10,11-dihydro - 5H - dibenzo[a,d]cycloheptene-5-one were dissolved in one litre of ethanol. 90 grams of thiourea were added and the mixture refluxed while stirring for 2 hours. Then about 800 millilitres of ethanol were evaporated and 1 litre of water added, whereupon the mixture was extracted with ether in order to remove any undissolved substance. The aqueous solution was then made alkaline with concentrated sodium hydroxide solution, and the oil which separated out dissolved again in the aqueous solution. Dilute hydrochloric acid was then added to the yellow solution until acid pH, and the oil which separated out was extracted with ether, the ether phase dried over anhydrous magnesium sulphate, filtered and evaporated on a steam bath to a volume of 150 millilitres. 150 millilitres of petroleum ether were added and the mixture cooled.

The white crystals of 10,11-dihydro-5,10-epithio-5H-dibenzo[a,d]cyclohepten-5-ol, which separated out, were sucked off and dried. They melted at 84–85 degrees centigrade. Yield: 70 grams.

To a mixture of 16 grams (0.67 mol) of magnesium turnings and 30 millilitres of dry tetrahydrofuran was added a crystal of iodine and 0.5 ml. of ethylbromide, and the mixture was heated until a vigorous reaction started. After the reaction had subsided a solution of 61 grams (0.5 mol) of 3-chloro-N,N-dimethylpropylamine in 120 millilitres of dry tetrahydrofuran was added dropwise while refluxing in the course of 20 minutes. Thereafter the mixture was boiled under reflux on a steam bath for 2 hours. To the resulting solution was added under reflux and while stirring a solution of 48 grams (0.2 mol) of 10,11 - dihydro-5,10-epithio-5H-dibenzo[a,d]cyclohepten-5-ol in 200 millilitres of dry tetrahydrofuran, whereupon the mixture was heated under reflux and while stirring for 2 hours. After cooling the reaction mixture was poured into 1 litre of ice-water and made acid with acetic acid. The mixture was washed with 1 litre of ether in a separatory funnel, and the acid aqueous phase separated from the ether phase, and made alkaline with aqueous ammonia. The precipitate was extracted with ether, the ether phase dried over anhydrous magnesium sulphate, filtered and evaporated. The residue—a yellow oil—was dissolved in 200 millilitres of ethanol and a solution of dry hydrogen chloride in ether was added until pH 5. Upon standing 30 grams of the hydrochloride of 10,11-dihydro-5-(3 - dimethylaminopropyl)-10-mercapto-5H-dibenzo[a,d]cyclohepten-5-ol crystallized as colourless crystals melting at 215–217 degrees centigrade.

30 grams (0.08 mol) of the hydrochloride of 10,11-dihydro-5-(3-dimethylaminopropyl) - 10 - mercapto-5H-dibenzo[a,d]cyclohepten-5-ol were suspended in 500 millilitres of chloroform whereupon the mixture was saturated with dry hydrogen chloride. The mixture was heated while stirring and refluxing on a steam bath until the substance had dissolved and thereafter for further 30 minutes. The chloroform was evaporated and 200 millilitres of acetone were added. The crystals of the hydrochloride of 10,11-dihydro-5-(3-dimethylaminopropyl)-5,10-epithio-5H-dibenzo[a,d]cyclohepten, which separated out, was sucked off and consisted of colourless crystals which melted at 270–273 degrees centigrade. Yield: 25 grams. The corresponding free amine crystallizes from petroleum ether and melts at 94–95 degrees centigrade.

EXAMPLE 2

10,11-dihydro-5-(3-methylaminopropyl)-5,10-epithio-5H-dibenzo[a,d]cyclohepten and its hydrochloride To a solution of 6.2 grams (0.02 mol) of 10,11-dihydro-5-(3-dimethylaminopropyl) - 5,10 - epithio-5H-dibenzo[a,d]cycloheptene in 50 millilitres of dry benzene were added 10 grams of ethyl chloroformate dropwise and while stirring keeping the mixture at 40–50 degrees centigrade under the addition. The mixture was heated to 50 degrees centigrade for 1 hour, then cooled and washed with 50 millilitres of 1 N hydrochloric acid.

The benzene phase was dried over anhydrous potassium carbonate, filtered and evaporated. The residue was dissolved in 150 millilitres of diethyleneglycol monomethyl ether and a solution of 12 grams of potassium hydroxide in 12 millilitres of water was added, whereupon the solution was boiled for 20 hours under reflux. After cooling the solution was poured into water and extracted with ether. The ether phase was extracted with dilute hydrochloric acid, the acid solution was made alkaline with dilute sodium hydroxide and the base which separated out was extracted with ether. The ether phase was dried over anhydrous potassium carbonate, filtered and evaporated. The residue was dissolved in 25 millilitres of acetone and a solution of dry hydrogen chloride in ether was added to pH 5. Upon standing 3.5 grams of the hydrochloride of 10,11-dihydro-5-(3 - methylaminopropyl)-5,10-epithio-5H-dibenzo[a,d]cycloheptene separated out as white crystals which melts at 237–240 degrees centigrade.

EXAMPLE 3

1 - chloro-10,11-dihydro-5-(3-dimethylaminopropyl)-5,10-epithio - 5H-dibenzo[a,d]cycloheptene, 2-chloro-10,11-dihydro - 5 - (3-dimethylaminopropyl)-5,10-epithio-5H-dibenzo[a,d]cycloheptene, 3-chloro-10,11-dihydro-5-(3-dimethylaminopropyl) - 5,10 - epithio-5H-dibenzo[a,d]cycloheptene, 1 - fluoro - 10,11-dihydro-5-(3-dimethylaminopropyl) - 5,10 - epithio - 5H-dibenzo[a,d]cycloheptene and their hydrochlorides The starting 1 - chloro - 10,11-dihydro-5-(3-dimethylaminopropyl) - 10-mercapto-5H-dibenzo[a,d]cyclohepten-5-ol was prepared in the following way:

50 grams of 1 - chloro-10,11-dihydro-5H-dibenzo[a,d]cyclohepten-5-one were dissolved in 350 millilitres of carbon tetrachloride and 37 grams of N-bromosuccinimide and 1 gram of benzoyl peroxide were added and the mixture was heated while stirring under reflux at 76–78 degrees centigrade. When the reaction starts the mixture begins to boil from the reaction heat and the boiling lasts about 15 minutes. After the reaction has subsided the mixture is heated for a further 15 minutes on a steam bath. The succinimide is filtered off and the filtrate evaporated in vacuo. 10 - bromo-1-chloro-10,11-dihydro-5H-dibenzo[a,d]cyclohepten-5-one is thereby obtained as a yellow oil. Some 11-bromo-isomer is present as an impurity.

The reaction of the 10-bromo-compound with thiourea was carried out exactly as described in Example 1 and 1-chloro - 10,11-dihydro-5,10-epithio-5H-dibenzo[a,d]cyclohepten-5-ol was obtained as a yellow oil.

The Grignard reaction was carried out as described in Example 1 substituting 10,11-dihydro-5,10-epithio-5H-dibenzo[a,d]cyclohepten - 5-ol with the corresponding 1-chloro derivative whereby 1-chloro-10,11-dihydro-5-(3-dimethylaminopropyl) - 10 - mercapto - 5H-dibenzo[a,d]cyclohepten-5-ol was obtained as a yellow oil.

25 grams of this oil were dissolved in 200 millilitres of glacial acetic acid, 100 millilitres of concentrated hydrochloric acid were added and the mixture left standing for 16 hours at room temperature, whereupon the mixture was poured onto ice and made alkaline with aqueous ammonia. The base which separated out was extracted with ether, the ether phase dried over anhydrous potassium carbonate, filtered, and the ether evaporated. The resulting oil was dissolved in acetone and the hydrochloride precipitated with dry hydrogen chloride. Yield: 17 grams of the hydrochloride of 1-chloro-10,11-dihydro-5-(3-dimethylaminopropyl) - 5,10-epithio-5H-dibenzo[a,d]cycloheptene which after recrystallization from ethanol melts at 274–276 degrees centigrade.

In equivalent manner were prepared 2-chloro-10,11-dihydro - 5 - (3-dimethylaminopropyl)5,10-epithio-5H-dibenzo[a,d]cycloheptene hydrochloride, M.P. 228–230 degrees centigrade, 3 - chloro-10,11-dihydro-5-(3-dimethylaminopropyl) - 5,10-epithio-5H-dibenzo[a,d]cycloheptene hydrochloride, M.P. 259–261 degrees centigrade and 1-fluoro - 10,11 - dihydro-5-(3-dimethylaminopropyl)-5,10-epithio-5H-dibenzo[a,d]cycloheptene hydrochloride, M.P. 269–275 degrees centigrade.

EXAMPLE 4

Other 10,11-dihyro-5,10-epithio-5H-dibenzo[a,d]cycloheptenes and their hydrochlorides When Example 1 was carried out using equivalent amounts of the hydrochlorides of 3-methyl-10,11-dihydro-5-(3-dimethylaminopropyl)-10-mercapto-5H-dibenzo[a,d]cyclohepten-5-ol,
1-propyl-10,11-dihydro-5-(3-dimethylaminopropyl)-10-mercapto-5H-dibenzo[a,d]cyclohepten-5-ol,
1-methoxy-10,11-dihydro-5-(3-dimethylaminopropyl)-10-mercapto-5H-dibenzo[a,d]cyclohepten-5-ol,
3-methoxy-10,11-dihydro-5-(3-dimethylaminopropyl)-10-mercapto-5H-dibenzo[a,d]cyclohepten-5-ol,
1-trifluoromethyl-10,11-dihydro-5-(3-dimethylaminopropyl)-10-mercapto-5H-dibenzo[a,d]cyclohepten-5-ol,
2-trifluoromethyl-10,11-dihydro-5-(3-dimethylaminopropyl)-10-mercapto-5H-dibenzo[a,d]cyclohepten-5-ol and
10,11-dihydro-5-(3-diethylaminopropyl)-10-mercapto-5H-dibenzo[a,d]cyclohepten-5-ol respectively instead of the hydrochloride of 10,11-dihydro-5 - (3 - dimethylaminopropyl) - 10-mercapto-5H-dibenzo[a,d]cyclohepten-5-ol, the hydrochlorides of 3-methyl-10,11-dihydro-5-(3-dimethylaminopropyl)-5,10-epithio-5H-dibenzo[a,d]cycloheptene,
1-propyl-10,11-dihydro-5-(3-dimethylaminopropyl)-5,10-epithio-5H-dibenzo[a,d]cycloheptene,
1-methoxy-10,11-dihydro-5-(3-dimethylaminopropyl)-5,10-epithio-5H-dibenzo[a,d]cycloheptene,
3-methoxy-10,11-dihydro-5-(3-dimethylaminopropyl)-5,10-epithio-5H-dibenzo[a,d]cycloheptene,
1-trifluoromethyl-10,11-dihydro-5-(3-dimethylaminopropyl)-5,10-epithio-5H-dibenzo[a,d]cycloheptene,
2-trifluoromethyl-10,11-dihydro-5-(3-dimethylaminopropyl)-5,10-epithio-5H-dibenzo[a,d]cycloheptene and
10,11-dihydro-5-(3-diethylaminopropyl)-5,10-epithio-5H-dibenzo[a,d]cycloheptene respectively were obtained as white crystalline substances.

The compounds of Formula I and the non-toxic acid addition salts thereof may be administered to animals including human beings both orally and parenterally, and may be used for example in the form of tablets, capsules, powders, syrups or in the form of the usual sterile solutions for injection. Results upon administration to human beings have been very gratifying.

Most conveniently the compounds of Formula I are administered orally in unit dosage form such as tablets or capsules, each dosage unit containing a non-toxic acid addition salt of one of the said compounds in an amount of from about 1 to 50 mg., most preferably, however, from about 5 to 25 mg., calculated as the free amine, the total daily dosage usually ranging from about 3 to about 300 mg. depending upon the body weight of the individual being treated and the severity of the psychic disorder. Mostly, however, the total daily dosage is within the range of from about 15 to 150 mg.

When preparing tablets the active ingredient is for the most part mixed with ordinary tablet adjuvants, such as corn starch, potato starch, talcum, magnesium stearate, gelatine, lactose, gums, or the like. A suitable formula for a tablet containing 10 mg. of 10,11-dihydro-5-(3-dimethylaminopropyl) - 5,10-epithio-5H-dibenzo[a,d]cycloheptene (called Lu 8–063 for short) in the form of its hydrochloride is as follows:

| | Mg. |
|---|---|
| Lu 8–063, hydrochloride | 13.1 |
| Potato starch | 36 |
| Lactose | 18 |
| Gelatine | 5 |
| Talcum | 6 |
| Magnesium stearate | 0.4 |

Any other pharmaceutical tableting adjuvants may be used provided that they are compatible with the active ingredient, and additional compositions and dosage forms may be similar to those presently used for thymoleptics such as imipramine, amitripytiline or nortriptyline. Also, combination of the compounds of Formula I as well as their non-toxic acid salts with other active ingredients, especially other thymoleptics, neuroleptics, tranquillizers, or the like, fall within the scope of the present invention.

As previously stated, when isolating the compounds of Formula I in the form of an acid addition salt the acid is preferably selected so as to contain an anion which is non-toxic and pharmacologically acceptable, at least in usual therapeutic doses. Representative salts which are included in this preferred group are the hydrochlorides, hydrobromides, sulphates, acetates, phosphates, nitrates, methanesulphonates, ethanesulphonates, lactates, citrates, tartrates or bitartrates, and maleates of the amines of Formula I. Other acids are likewise suitable and may be employed, if desired. For example fumaric, benzoic, ascorbic, succinic, salicylic, bismethylenesalicylic, propionic, gluconic, malic, malonic, mandelic, cinnamic, citraconic, stearic, palmitic, itaconic, glycolic, benzene sulphonic, and sulphamic acids may also be employed as acid addition salt-forming acids. When it is desired to isolate a compound of the invention in the form of the free base, this may be done according to conventional procedure, as by dissolving the isolated or unisolated salt in water, treating with a suitable alkaline material, extracting the liberated free base with a suitable organic solvent, drying the extract and evaporating to dryness or fractionally distilling to effect isolation of the free base amine.

It is to be understood that the invention is not limited to the exact details of operation or exact compound or compositions shown and described, as obvious modifications and equivalents will be apparent to one skilled in the art.

What I claim is:

1. A compound selected from the class consisting of compounds of the general formula:

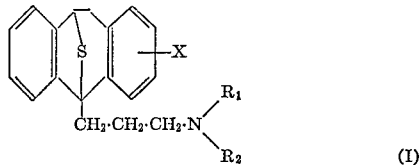

(I)

wherein $R_1$ and $R_2$ each is selected from the group consisting of hydrogen and alkali groups with from 1 to 4 carbon atoms inclusive, provided that $R_1$ and $R_2$ may not both represent hydrogen, and X is selected from the group consisting of hydrogen, an alkyl group with from 1 to 4 carbon atoms inclusive, an alkyloxy group with from 1 to 4 carbon atoms inclusive, halogen and trifluoromethyl and non-toxic acid addition salts thereof.

2. A compound according to claim 1, characterized thereby that $R_1$ and $R_2$ each is selected from the group consisting of hydrogen and a methyl group, provided that $R_1$ and $R_2$ may not both represent hydrogen, and X is selected from the group consisting of hydrogen and halogen.

3. A compound according to claim 1 which is 10,11-dihydro - 5 - (3-dimethylaminopropyl)-5,10-epithio-5H-dibenzo[a,d]cycloheptene or a non-toxic acid addition salt thereof.

4. A compound according to claim 1 which is 10,11-dihydro-5-(3-dimethylaminopropyl) - 5,10 - epithio-5H-dibenzo[a,d]cycloheptene hydrochloride.

5. A compound according to claim 1 which is 10,11-dihydro - 5 - (3-methylaminopropyl)-5,10-epithio-5H-dibenzo[a,d]cycloheptene or a non-toxic acid addition salt thereof.

6. A compound according to claim 1 which is 10,11-dihydro - 5 - (3-methylaminopropyl)-5,10-epithio-5H-dibenzo[a,d]cycloheptene hydrochloride.

7. A compound according to claim 1 which is 1-chloro-10,11-dihydro - 5 - (3-dimethylaminopropyl)-5,10-epithio-5H-dibenzo[a,d]cycloheptene or a non-toxic acid addition salt thereof.

8. A compound according to claim 1 which is 1-chloro-10,11-dihydro - 5 - (3-dimethylaminopropyl)-5,10-epithio-5H-dibenzo[a,d]cycloheptene hydrochloride.

9. A compound according to claim 1 which is 2-chloro-10,11 - dihydro - 5 - (3-dimethylaminopropyl)-5,10-epithio-5H-dibenzo[a,d]cycloheptene or a non-toxic acid addition salt thereof.

10. A compound according to claim 1 which is 2-chloro-10,11-dihydro - 5 - (3-dimethylaminopropyl)-5,10-epithio-5H-dibenzo[a,d]cycloheptene hydrochloride.

11. A compound according to claim 1 which is 3-chloro - 10,11 - dihydro-5-(3-dimethylaminopropyl)-5,10-epithio-5H-dibenzo[a,d]cycloheptene or a non-toxic acid addition salt thereof.

12. A compound according to claim 1 which is 3-chloro - 10,11 - dihydro-5-(3-dimethylaminopropyl)-5,10-epithio-5H-dibenzo[a,d]cycloheptene hydrochloride.

13. A compound according to claim 1 which is 1-fluoro- 10,11 - dihydro-5-(3-dimethylaminopropyl)-5,10-epithio-5H-dibenzo[a,d]cycloheptene or a non-toxic acid addition salt thereof.

14. A compound according to claim 1 which is 1-fluoro-10,11-dihydro - 5 - (3-dimethylaminopropyl)-5,10-epithio-5H-dibenzo[a,d]cycloheptene hydrochloride.

References Cited

UNITED STATES PATENTS

| | | | |
|---|---|---|---|
| 3,494,935 | 2/1970 | Christy | 260—327 |
| 3,444,169 | 5/1969 | Howell et al. | 260—268 |
| 3,478,056 | 11/1969 | Schmutz et al. | 260—327 |
| 3,192,204 | 6/1965 | Craig et al. | 260—240 |
| 3,467,756 | 9/1969 | Stone | 424—283 |
| 3,660,389 | 5/1972 | Hucker et al. | 260—247.2 |

OTHER REFERENCES

Reid: Organic Chemistry of Bivalent Sulfur, vol. II (Chem. Pub. Co., New York, 1960), pp. 16–17.

Thielheimer: Synthetic Methods of Organic Chemistry, vol. 14 (Karger, New York, 1960), p. 247, #525.

Smith: The Chemistry of Open-Chain Organic Nitrogen Compounds, vol. I (Benjamin, New York, 1965), pp. 260–261.

HENRY R. JILES, Primary Examiner

C. M. S. JAISLE, Assistant Examiner

U.S. Cl. X.R.

424—275

UNITED STATES PATENT OFFICE
CERTIFICATE OF CORRECTION

Patent No. 3,763,186  Dated October 2, 1973

Inventor(s) Niels Lassen

It is certified that error appears in the above-identified patent and that said Letters Patent are hereby corrected as shown below:

Column 5, line 52:

"dimethylaminopropyl)5" should be ---dimethylaminopropyl)-5---.

Column 7, line 18:

"free base" should be ---free basic---.

Column 7, line 37:

"alkali" should be ---alkyl---.

Signed and sealed this 23rd day of April 1974.

(SEAL)
Attest:

EDWARD M. FLETCHER, JR.
Attesting Officer

C. MARSHALL DANN
Commissioner of Patents